Jan. 20, 1925.
E. READ
1,523,718
STOP AND DIRECTION INDICATOR AND TAIL LIGHT ATTACHMENT FOR ROAD VEHICLES
Filed July 22, 1922  4 Sheets-Sheet 1
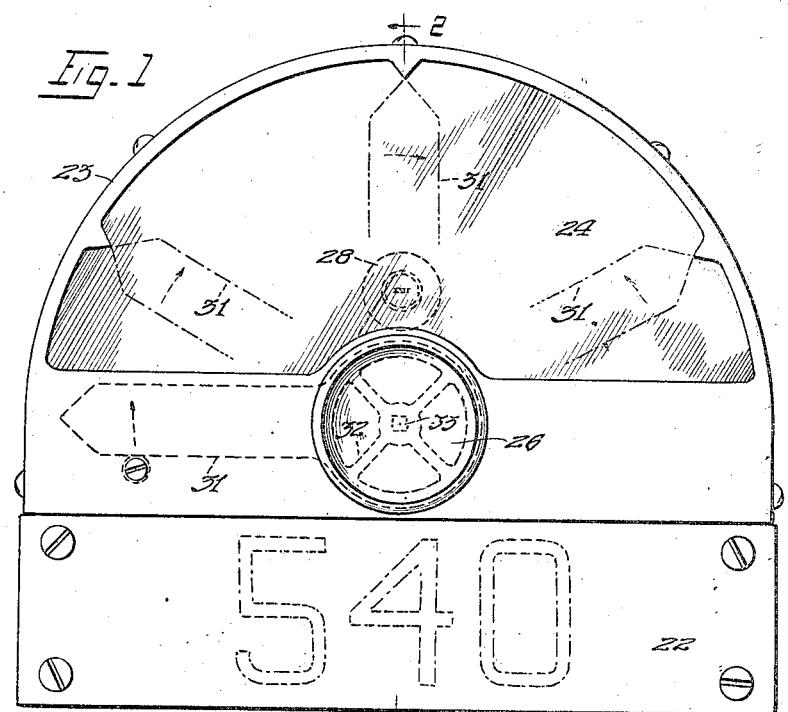
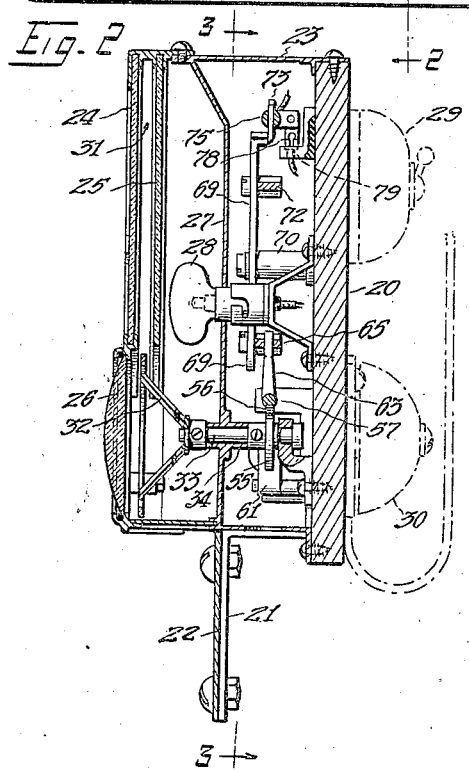

Jan. 20, 1925.  1,523,718
E. READ
STOP AND DIRECTION INDICATOR AND TAIL LIGHT ATTACHMENT FOR ROAD VEHICLES
Filed July 22, 1922  4 Sheets-Sheet 2
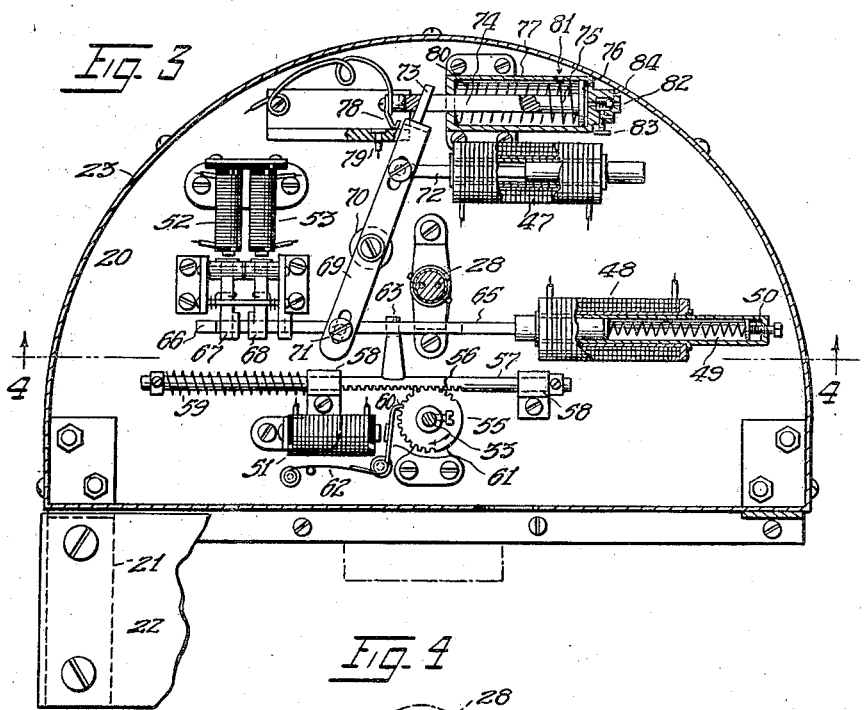
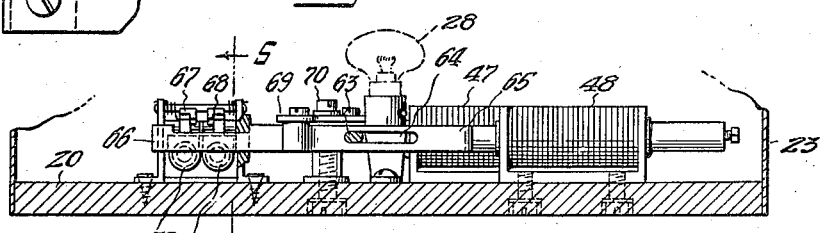
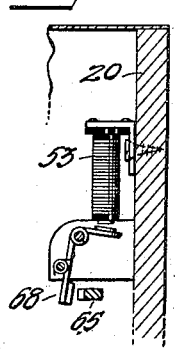
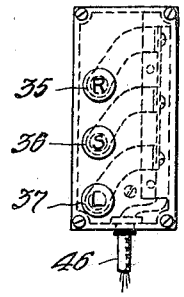
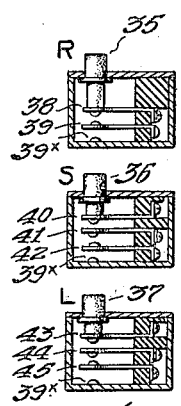

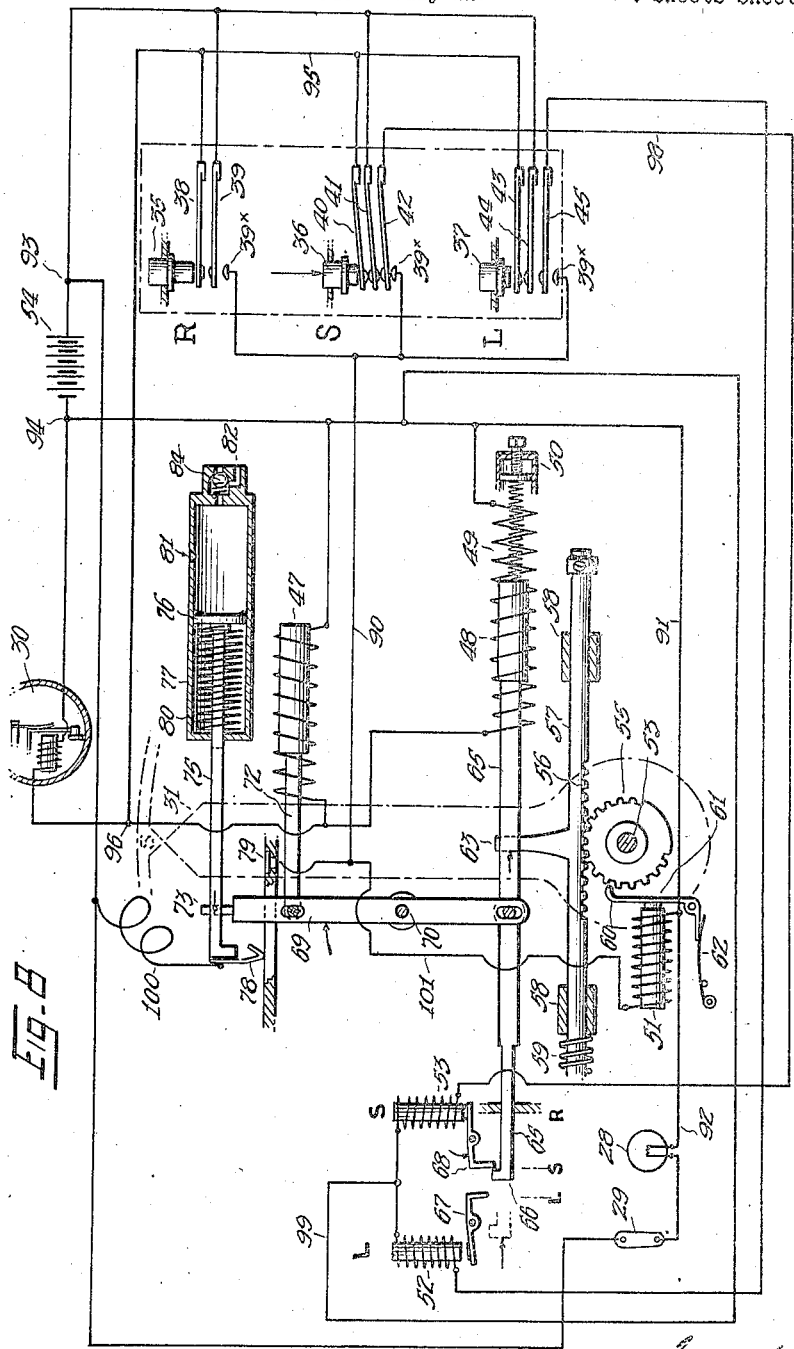

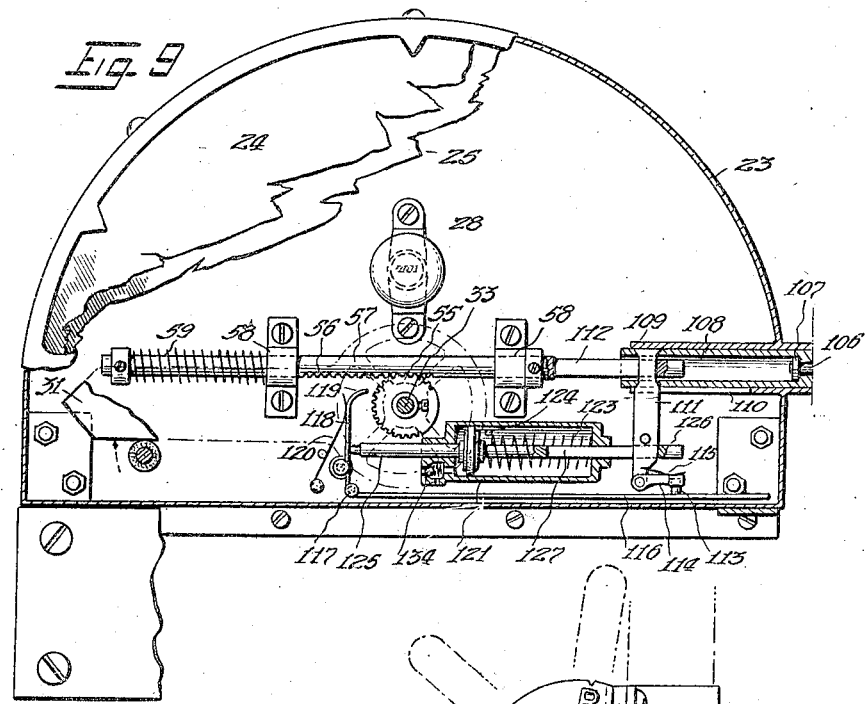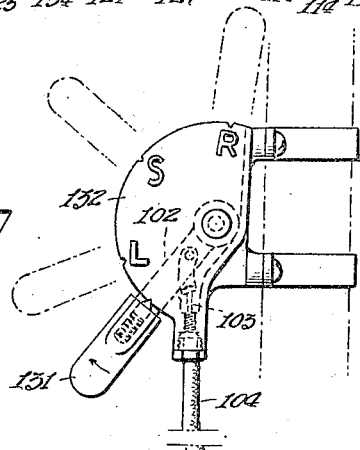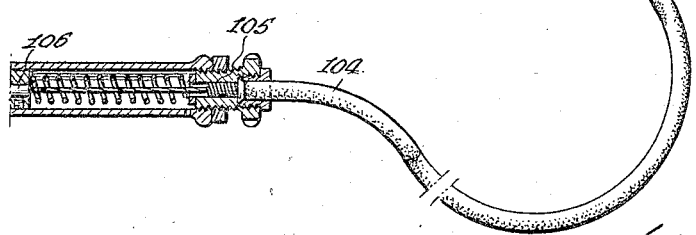

Patented Jan. 20, 1925.

1,523,718

UNITED STATES PATENT OFFICE.

EDMOND READ, OF SYDNEY, AUSTRALIA.

STOP AND DIRECTION INDICATOR AND TAIL-LIGHT ATTACHMENT FOR ROAD VEHICLES.

Application filed July 22, 1922. Serial No. 576,657.

*To all whom it may concern:*

Be it known that I, EDMOND READ, subject of the King of Great Britain and Ireland, residing at Dalton House, 115 Pitt Street, Sydney, in the county of Cumberland and State of New South Wales, Australia, have invented certain new and useful Improvements in Stop and Direction Indicators and Tail-Light Attachments for Road Vehicles, of which the following is a specification.

This invention relates to devices associated with a road vehicle tail light for the purpose of indicating by semaphore signals, the intended action of the driver of the vehicle in stopping, slowing, or turning to left or right as the case may be. The device is operated by a control located within reach of the driver for enabling him to cause a movement of the semaphore to offer the necessary indication to following vehicles, and the apparatus is characterized in that it includes automatic means for restoring the semaphore to neutral (invisible) position after a predetermined period following operation of the manual control; this period being determined according to the number of seconds judged necessary to allow of the movement of the vehicle to be performed after the control has been operated. Electrical and mechanical parts associated with the semaphore device are contained in a casing enclosed in a hemispherical sector of it and glazed to exhibit the movement of the semaphore arm within it. The usual red tail light is disposed below the centre of the sector, and above the registration number plate, said plate being illuminated by light reflected downward from a lamp within the casing, which lamp serves at once to offer illumination for the semaphore case and for the red signal. The mechanism consists of electro-magnetic devices for moving the semaphore, for locking it for a predetermined period in any position to which it is brought by the electro-magnetic action, and for releasing it and returning it automatically to neutral position, in which position it is secreted by an opaque portion of the casing so that the glazed sector appears clear during normal running of the car on a straight course. For the electro-mechanical control device which is preferably used, a mechanical control device may be substituted performing substantially the same functions and operated through a Bowden wire control by a hand lever.

In the accompanying drawings,—

Fig. 1 is a front elevational view showing the external appearance of the indicator device complete, a small portion of the casing being shown broken to indicate the resting of the semaphore arm on a stop whilst it is in neutral position;

Fig. 2 is a transverse vertical section on the line 2—2 Fig. 1, in the direction of the arrow thereon;

Fig. 3 is an incomplete longitudinal sectional elevation on the plane 3—3 Fig. 2 in the direction of the arrow thereon;

Fig. 4 is a horizontal section on the line 4—4, Fig. 3;

Fig. 5 is a fragmentary transverse section on the line 5—5 Fig. 4;

Fig. 6 is an external view of the casing containing a push button and contact spring assembly;

Fig. 7 shows sectional views of the detail of the spring contact arrangements which are associated with three push buttons marked for "Right" "Stop or Slow" and "Left", respectively Fig. 8 is a semi-diagrammatic view explanatory of the electric circuits in the type of the apparatus in which operation is by electro-mechanical means;

Fig. 9 is a fragmentary vertical sectional elevation illustrative of the mechanism used when a wholly mechanical control device is used instead of an electro-mechanical control device, shown in previous figures; and Fig. 10 is a sectional elevational view showing the Bowden wire control arrangement associated with the mechanical equipment illustrated in Fig. 9.

The housing of the indicator comprises a back plate 20, a bracket 21 below same to carry the registration number plate 22, a semi-circular casing 23, a semi-circular glazed front 24 in same, and a corresponding false front 25, also glazed, rearward of the front 24 and offering a cell space forward of it, to accommodate a semaphore signal arm, a red disc or lens 26 forming the "tail light", and an opaque diaphragm 27 behind which the electrical and mechanical mechanism is located, said mechanism being supported on the back plate 20. A lamp 28 is fixed between the diaphragm 27 and the false front 25. Rearward of the plate 20 a control switch 29 is mounted, and there may also be fitted on the back of the board 20 a gong bell 30, said bell being actuated at each operation of the mechanism to direct attention of persons behind the car to to the fact that the semaphore has been moved to give an indication of which notice should be taken. In the cell between the main front 24 and the false front 25 a semaphore arm 31 is located. It is carried on a spider 32, the hub of which is fixed to a spindle 33 rotatable in a bearing 34 supported on the back plate 20, and by the diaphragm 27 also if necessary. The electrical circuits are arranged to maintain the lamp 28 illuminated under all circumstances whilst the switch 29 is closed. The light from the lamp 28 illuminates the "tail light" 26 and also illuminates the face of the number plate 22; for the latter purpose a vent being provided in the lower portion of the casing above the number plate.

Referring to Figs. 6 and 7. The control device (Fig. 6) is fixed on the steering head or post or on the dash board of the vehicle. It contains three push buttons allocated respectively to "R" (right) "S" (stop or slow) and "L" (left), these buttons being numbered respectively 35, 36, and 37, the button 35 is adapted to close two circuits through the contact springs 38 and 39 and the fixed contact 39ˣ; the button 36 to close three circuits through the contact springs 40, 41 and 42 and 39ˣ, and the button 37 to close three circuits through the contact springs 43, 44, 45 and 39ˣ. The cable 46 containing the insulated wires from each of these contacts is led to the indicator preferably through an armoured casing to protect it from chafing.

The electrical equipment in the indicator comprises a solenoid 47, a solenoid 48 fitted with a retiring spring 49 and a tension adjusting device 50, a locking magnet 51, and two control magnets 52 and 53. These several solenoids and electromagnets are circuited to the respective contacts 38 to 45 as shown in Fig. 8, a battery being included in the circuit as also is the lamp 28 with its switch 29 and the gong bell 30. The bell 30 is in the common return circuit of the several contacts and is therefore operated when any one of the contact sets is closed. The solenoids 47 and 48 acting oppositely through an oscillating beam 69 are balanced against throw of their plungers in either direction due to jolting or vibration of the vehicle.

Upon the spindle 33 a spur wheel 55 is keyed. This wheel gears with a rack 56 on a slider rod 57. This rod is movable axially in bearings 58 and is normally moved to the left by means of a helical spring 59 when the electro-magnetic controls are not operating. The teeth of the gear are engageable by the catch 60 on the armature 61 of the electro- magnet 51. Said armature is normally advanced to engage the wheel 55 by a spring 62, and it is retired by the action of the electro-magnet 51. A finger 63 projecting laterally from the rod 57 is accommodated in a slot 64 on a lock plunger 65. This plunger carries the armature of the solenoid 48 on its right hand end, and at its left hand end is provided with a toe piece 66 which is engageable with checks on ends of the armatures 67 and 68 of the electro-magnets 52 and 53 respectively. A rocking beam 69 mounted on a pivot 70 engages the lock plunger 65 by a pin and slot connection 71, and similarly engages an extension 72 of the armature of the solenoid 47. At its top end the lever 69 is formed with a finger 73 accommodated in a slot 74 in a piston rod 75 having a piston 76 at its distant end, said piston working in a dash pot solenoid 77. The forward end of the piston rod 75 carries a sliding contact 78 engageable with the contact shoe 79 which is connected into the circuit as shown in Fig. 8. Behind the piston 76 is a spring 80 which is tensioned to push the piston inward to its extreme position shown in Fig. 3. The solenoid 77 is provided with an air leak hole 81 in its side and with an air bleeder hole 82 in the rear end of it, the area of the bleeder controlled by a cone pin adjustment 83; 84 being a check valve arranged to freely admit air during the forward stroke of the piston, in which movement the spring 80 is compressed by the inflowing air.

The operation of the parts may now be described.

A branch 92 from a tap on the winding of the electro-magnet 51 passes through the lamp 28 and the switch 29 to the negative side of the battery at 93, the line 91 from the positive side of the battery 94 completing the lamp circuit for night use.

As shown in Fig. 8, the "stop or slow" button 36 has been depressed, thereby closing together the contact springs 40, 41 and 42 with the fixed contact 39ˣ. A circuit is thus established on the one side through a common line 90 which is branched to the shoe 79 and to the winding of the electro-magnet 51.

On the forward side the contact springs complete the following circuits from the common wire 90. Firstly, a circuit through the multiple line 95 to the point 96, whence one circuit goes through the bell 30 to the battery positive at 94. From the point 96 also comes a circuit including the windings of the solenoids 47 and 48 in parallel, thence from the negative side of the battery 54 through the common line 97 to the centre spring 41. The circuit through the spring 42 goes by the line 98 to the winding of the "slow" control magnet 53, and thence by the line 99 to the positive terminal 94 of the battery 54. The effect obtained, therefore, by the closing of the three springs 40, 41 and 42 on their fixed contact 39x is to operate the solenoids 47 and 48, to move the piston 76 outward and compress the spring 80, and to bring the contact 78 beyond the shoe 79. The magnet 53 meantime operates to throw its armature 68 to bring its check to the locking position in which it engages and stops the movement of the lock rod 65 by engaging it. A movement of the required range is thus imparted through the finger 63 to the rack 56, and through it to the spur wheel 55 and the semaphore arm 31. The rotational movement applied to the spindle 33 is that required to bring the semaphore arm to the middle or stop position (see Fig. 1). Movement of the spur wheel 55 is permitted because whilst current is passing, the magnet 51 is actuated to withdraw the armature lock from said wheel. Immediately the button 36 is released, the spring 62 operates to throw the lock armature 61 forward and engage the wheel 55, thus to hold the semaphore arm in the "stop" position. Upon the release of the control button 36, the circuits through the magnet 53 and the solenoids 47 and 48 are also broken, and the lock rod 65 is moved mechanically by the spring 80. The movement is rapid until the piston covers the air leak hole 81; thereafter it is a slow movement depending upon the adjustment of the screw 83. This screw may be set to allow any required number of seconds, say five to ten, to elapse between the time the piston 76 covers the hole 81 and the time at which it has moved back sufficiently to contact the spring 78 with the shoe 79. When this contact occurs, a circuit is established from the negative terminal 93 of the battery, the floating line 100 and the line 101, to the winding of the magnet 51. When that circuit is closed, the lock armature 61 is withdrawn, and the spring 59 operates rapidly then to move the rack 56 and to turn the semaphore arm back to neutral position, in which it is hidden from view. For the "right" position of the semaphore arm, the lock bar 65 moves to its extreme position. For the "left" indication the lock bar 65 is engaged by the armature 67 of the magnet 52. The circuit arrangement for each of the three positions may be followed readily from the diagram in Fig. 8, in view of the explanation given already in relation to the "stop" position operation.

In the operation of each button respectively, the alarm gong 30 is sounded and the semaphore is moved to the required indicating position, and it remains in that position for a predetermined time after the finger pressure on the operating button has been released. At the termination of the allocated period, the semaphore arm drops back to neutral position automatically. During night operation, when the switch 29 is closed, the lamp 28 is kept illuminated continuously, with the result that red light is displayed at 26 and the registration number is illuminated.

In the mechanical device (Figs. 9 and 10) the external appearance of the tail fitting corresponds with that shown in Fig. 1. The plunger 57 is mounted to slide endwise in guides 58, as before, under control of a spring 59, which operates to normally pull it to the left. The rack 58 engages the spur wheel 55, as before, to operate the semaphore arm 31, which is fixed on its spindle 33. The control device is a hand lever 131 moved over a sector guide 132, this guide being marked for three positions, as in the case of the electrical arrangement "R", "S" and "L". There is also an idle position, which is the release position, in which the lever 131 is shown in full lines; its adjusted position for the "R", "S" and "L" operations being indicated in dotted lines. The hand lever 131 is on the head of an arm 102 to which arm the end of a Bowden wire 103 is connected, 104 being the armoured casing of said wire. The distant end of the Bowden wire is fitted as usual in a socket carrier 105, the cord terminal 106 being fixed in an end nob 107 within a tube 108 slidable within a tubular casing guide 109, said guide being slotted at 110 to accommodate an arm 111 fixed in the tube 108. The arm 111 passes through a slot 112 in the rack rod 57. On its lower end, the arm 111 carries a frictional shoe 113 carried on an arm 114, which arm is pressed downward by a spring 115 so that the shoe 113 is held in frictional contact with a light slide rod 116; said rod is pivotally connected at 117 to a lock lever 118, the head 119 of which is bent to engage the teeth of the wheel 55. Whilst the semaphore arm is set the lock 118 is held engaged with the wheel 55 by the leaf spring 120. The dash pot cylinder 121, which corresponds functionally with the dash pot control arrangement shown in the electrical arrangement in the previous figures, has its piston 122 normally forced outward by the spring 123. The cylinder 121 is provided with an air leak hole 124 corresponding with the hole 81 in previous figures, and also with a controllable bleeder and valve as shown as 134, this last part corresponding structurally and functionally with the similar part shown in Fig. 3. The tail rod 125 of the piston 122 is arranged to strike the lock 118 when the piston has just reached the end of its active stroke. The piston rod 125 is slotted as shown at 127, the slot 127 straddling the arm 111.

The operation is as follows:—

As shown in Fig. 9, the parts are in idle position with the semaphore arm in neutral. Assuming that the hand lever 131 is moved to the "S" (slow or stop) position, the head 107 of the Bowden wire is moved to draw out the slide tube 108 a predetermined amount. In this outward movement the finger 111 is moved with it, and the piston 122 is drawn backward, compressing the spring 123. Immediately the tail rod 125 leaves the lock 118 the lock would engage the wheel 55 were it not that the shoe 113 acting on the friction rod 116 pulls the stop 118 out, thus leaving the wheel free to be rotated by the rack 58 and the semaphore arm to be swung round to the vertical position, which corresponds with the range of movement applied through the Bowden wire to the slide tube 108. The signal will remain in the set position until the hand lever 131 has been thrown back to the idle position as shown in Fig. 10, the slot 127 permitting this reverse movement without immediately causing the rod 57 to be moved by the spring 59. Immediately the negative movement is commenced, the shoe 113 moving in contact with the friction rod 116, acts to throw in the lock 118, thereby engaging the wheel 55 and holding the semaphore arm in the position to which it was brought by the positive movement of the control lever 131. At the same time the piston 122 is freed, and commences to move forward under the pressure of the spring 123, the slot 127 in the piston rod permitting this movement. The movement of the piston is rapid, as before, until it covers the leak hole 124, and thereafter it is slow according to the set of the bleeder valve. When it reaches the end of its stroke, its tail rod, striking the rod 118, releases the lock, whereupon the spring 59 acts to move the rack bar 57 and through it to turn the wheel 55 and bring the semaphore arm to the idle position.

The provision of the leak hole in the dash pot cylinder procures operation of the dash pot arrangement so that, irrespectively of the control operation, substantially the same period of pause is allowed at every position before the resetting movement of the semaphore arm takes place, and in each case the resetting movement is rapid, the object being thus attained of bringing the semaphore arm to a set position to indicate the driver's intention, to hold it there a predetermined number of seconds, and to allow it at the end of that period to drop quickly automatically back to neutral, out of sight. An indication is thus offered to following vehicles for a sufficiently long time to ensure driving safety, and the risk is obviated of leaving the signal set for a prolonged period in any position to which it might be brought by a driver, unless indeed the control button were kept closed continuously or the hand lever 131 held on a set position. The hand lever 131 is arranged to come back to idle position as shown in full lines Fig. 10 by the tension of the Bowden wire spring. The duty of the driver therefore consists only in momentarily bringing the control to the appropriate position, or in momentarily pressing the appropriate button according as the equipment is mechanical or electro-mechanical respectively.

What I claim as my invention and desire to secure by Letters Patent is:—

1. In a vehicle direction indicator, a pointer, means for moving said pointer to a plurality of positions, means for latching the same in any of said positions and means for releasing said latch means a predetermined time after the pointer has been latched in a given position.

2. In a vehicle direction indicator, a pointer, means for moving said pointer into a plurality of positions, means normally latching said means in any of said positions, means for releasing said latch means simultaneously with the operation of said moving means and additional means, including a portion of said releasing means, for releasing said latch means operable a predetermined time after said pointer has been moved to a selected position.

In testimony whereof I affix my signature.

EDMOND READ.